May 13, 1941.  C. D. MERRITT  2,241,468

ANIMAL DRENCHER

Filed Oct. 9, 1939

Inventor
CLIFFORD D. MERRITT

By Beaman & Langford
Attorneys

Patented May 13, 1941

2,241,468

UNITED STATES PATENT OFFICE 2,241,468

ANIMAL DRENCHER

Clifford D. Merritt, Jackson, Mich.

Application October 9, 1939, Serial No. 298,537

1 Claim. (Cl. 128—223)

This invention relates to animal drenchers and more particularly to a drencher especially adaptable to sheep drenching.

Drenching, or in other words, the feeding of a liquid medicine to animals through the mouth has heretofore been accomplished by the use of bottles or by pressure guns. Such drenching, however, has not been satisfactory for the reason that not only are large quantities of the drenching substance wasted but also the animals made nervous causing subsequent drenching to be difficult.

In the case of sheep drenching is usually resorted to for removing worms and when it is considered that an entire flock must be treated at the same time, it will be realized that any treatment which can be given in a reduced amount of time in an efficient manner and without frightening the animals is of considerable advantage.

The present invention constitutes a device for drenching animals without the disadvantages of the former practice. My invention is such an improvement over the prior art that whereas formerly one man could drench approximately ten sheep per hour, now by employing my invention sixty sheep per hour may be drenched by a single man without difficulty.

An object of the invention is to provide a drencher employing a measuring tube carrying a nozzle, the measuring tube being fillable from a portable container carried by the operator.

Another object of the invention is to provide an animal drencher having a measuring tube which is of soft pliable rubber whereby the same may be pinched inwardly from the outside to permit the running into the measuring tube of a quantity of drenching medicine equivalent to a predetermined fraction of the entire volume of the tube.

A further object of the invention is to provide an animal drencher having a measuring tube provided at one end with a nozzle and at the other end with a valve for the controlling of the running of the drenching medicine into the measuring tube, and an air inlet to permit the entrance of air into the measuring tube while the valve is closed and a drenching medicine is being run from the nozzle.

A still further object of the invention is to provide a portable drencher of the character described having a nozzle particularly adaptable to be placed in the space between the incisors and molars of the animal being drenched whereby the mouth of the animal may be maintained closed to prevent the spilling of drenching medicine and at the same time the nozzle may be directed toward the throat of the animal.

Figure 1:
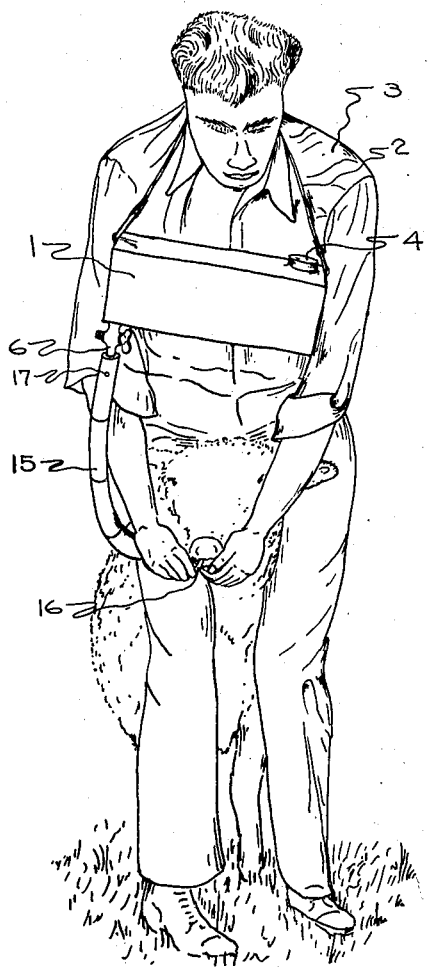
Figure 2:
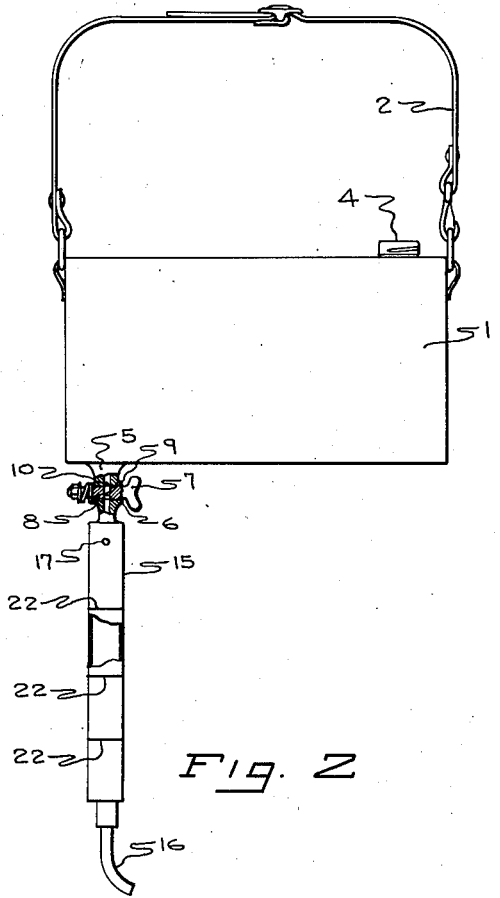
Figure 3:
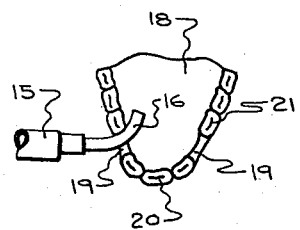

These and other objects will be apparent from the following specification when taken with the accompanying drawing in which Fig. 1 is an illustration disclosing the invention in actual operation, Fig. 2 is a side elevation showing parts in section, and Fig. 3 is a plan view of the lower jaw of a sheep's mouth disclosing the nozzle of the drencher according to the present invention disposed in position for administering the drenching medicine.

Referring particularly to the drawing, the reference character 1 indicates the medicine containing tank provided with a suitable strap 2 which is preferably adjustable and arranged for supporting the tank 1 about the neck of the operator 3. At the top of the tank 1 is a suitable filling opening provided with a screw closure 4.

At the bottom of the tank 1 and preferably to one side thereof as shown is an outlet nipple 5 communicating with any suitable valve 6, provided with a controlling handle 7. The valve member 8 of the valve 6 is provided with a port 9 which in open position as shown in Fig. 2 of the drawing is in alignment with the through passage 10. However, upon the turning of the handle 7 the port 9 is moved to a position out of alignment with the through passage 10 to close the valve.

Connected to the outlet of the valve 6 is a measuring tube 15. The tube 15 preferably is fabricated from soft pliable rubber or its equivalent. At the free end of the tube 15 is suitably connected an administering nozzle 16 for disposition in the mouth of the animal being drenched. The internal volume of the tube 15 should be equal to the maximum dosage to be administered. Adjacent the top of the tube 15 is an air inlet opening 17. In operation, assuming that a maximum dosage is to be administered the finger of the operator is placed over the outlet of the nozzle 16 and the valve 6 opened, permitting medicine to run from the tank 1 into the measuring tube 15 until it starts to flow from the air inlet 17. At this point the valve 6 is closed and it will be understood that the measuring tube 15 is filled with medicine. The nozzle 16 is then inserted in the mouth 18 of the animal being drenched and the medicine from the measuring tube 15 permitted to flow by gravity down the throat of the animal. Air to replace the medicine flowing from the tube 15 enters through the air opening 17.

As shown particularly in Fig. 3 the nozzle 16 is curved as shown so that when it is inserted in the mouth of the animal and disposed between one of the spaces 19 between the incisors 20 and molars 21, it may be conveniently held and at the same time direct the medicine down the throat of the animal.

When a partly grown animal is to be drenched, the quantity of medicine to be administered should be less than that for a full grown animal. Accordingly, instead of completely filling the measuring tube 15 it is partly filled before administering the dose. If from the operator's experience he judges for instance that one-half of the measuring tube is the proper dose, the measuring tube 15 is pinched from the outside at a point midway between its ends, the flexibility of the tube permitting the pinching to completely close off the lower half. The valve 6 is then opened filling the upper half of the tube 15 until the medicine flows from the air opening 17. The valve 6 is then closed and the finger of the operator placed over the open end of the nozzle 16 until the nozzle 16 is placed in the mouth of the animal. Similarly the amount of medicine run into the tube 15 through the valve 6 may be equal to any fraction of the tube 15 by simply pinching the same at the required point. For convenience bands 22 may be marked on the outside of the tube 15 at known intervals to indicate to the operator where the tube should be pinched for a particular dose. As shown the tube 15 is marked at each quarter. However, it will be obvious that other graduations as might be desired may be used.

The present construction is particularly advantageous in drenching sheep for the reason that the nozzle 16 may be placed in one of the spaces 19 between the incisors and the molars so that when the animal clamps his jaws shut which is the natural tendency, the mouth will be completely closed thereby preventing the escape of any of the medicine and consequently waste. It will be obvious from the facility with which the measuring tube 15 may be filled or partly filled as the case may be and the ease with which the nozzle 16 may be disposed in the mouth of the animal to be drenched and the medicine administered, that it will be possible to drench animals quickly and efficiently with a minimum loss of time. Furthermore, due to the exact measuring of each dose the danger of overdosing is eliminated.

Having thus described my invention what I desire to secure by Letters Patent and claim is:

A gravity feed animal drencher comprising a fluid tank, fluid conduit means connected at its upper end to said tank including a measuring tube, a valve located between said tank and the lower end of said tube, an administering nozzle connected to the lower end of said tube, an air inlet in said conduit means below said valve with its operation independent of the operation of said valve, the capacity of said tube and nozzle below said inlet constituting a maximum dosage, said air inlet with said valve open acting as an overflow and indicator and with said valve closed as an air inlet to enable the dosage to flow from said tube through said nozzle.

CLIFFORD D. MERRITT.